(12) United States Patent
Bealby

(10) Patent No.: US 12,292,805 B2
(45) Date of Patent: May 6, 2025

(54) SYSTEMS, DEVICES, AND METHODS FOR ASSET USAGE AND UTILIZATION MEASUREMENT AND MONITORING

(71) Applicant: Electro Rent Corporation, West Hills, CA (US)

(72) Inventor: Tim Bealby, Harrow (GB)

(73) Assignee: Electro Rent Corporation, West Hills, CA (US)

( * ) Notice: Subject to any disclaimer, the term of this patent is extended or adjusted under 35 U.S.C. 154(b) by 142 days.

(21) Appl. No.: 18/210,052

(22) Filed: Jun. 14, 2023

(65) Prior Publication Data
US 2023/0401131 A1    Dec. 14, 2023

Related U.S. Application Data

(60) Provisional application No. 63/351,876, filed on Jun. 14, 2022.

(51) Int. Cl.
   *G06F 11/22* (2006.01)
(52) U.S. Cl.
   CPC .............................. *G06F 11/2247* (2013.01)
(58) Field of Classification Search
   CPC ................................................ G06F 11/2247
   USPC ............................................................ 710/8
   See application file for complete search history.

(56) References Cited

U.S. PATENT DOCUMENTS

| | | | |
|---|---|---|---|
| 9,377,488 B2 * | 6/2016 | Braunstorfinger | G01R 1/025 |
| 11,956,274 B1 * | 4/2024 | Thompson | H04L 63/0823 |
| 2005/0278129 A1 * | 12/2005 | Benvenga | G06F 11/2247 |
| | | | 702/68 |
| 2006/0224341 A1 * | 10/2006 | Benvenga | G06F 11/2247 |
| | | | 702/68 |
| 2007/0283194 A1 | 12/2007 | Villella et al. | |
| 2010/0281412 A1 * | 11/2010 | Cataldo | G06F 3/04842 |
| | | | 714/57 |
| 2012/0166638 A1 | 6/2012 | Bornhoevd et al. | |
| 2016/0092175 A1 * | 3/2016 | Keene | G06F 9/46 |
| | | | 717/113 |
| 2016/0165663 A1 | 6/2016 | Shanmugam et al. | |
| 2016/0253620 A1 * | 9/2016 | Pollock | G06Q 10/087 |
| | | | 705/28 |
| 2019/0007560 A1 | 1/2019 | Yan et al. | |

(Continued)

OTHER PUBLICATIONS

Gough "Tutorial: Introduction to SCPI Automation of Test Equipment with pyvisa." In:goughlui.com, Mar. 28, 2021, [online] [retrieved on Aug. 14, 2023 (Aug. 14, 2023)] Retrieved from the Internet , entire document.

(Continued)

*Primary Examiner* — Christopher B Shin
(74) *Attorney, Agent, or Firm* — Command IP LLP; Pejman Yedidsion

(57) ABSTRACT

Systems, devices, and methods for detecting and monitoring a device's usage metrics and providing a utilization management of the monitored device based on transmitting Standard Commands for Programmable Instruments (SCPI) commands using a Virtual Instrument Software Architecture (VISA) protocol. Additionally, determining whether the discovered connected device is sending and receiving data on a VISA data channel indicating that the discovered connected device is being used for performing high speed data tests and executing a set of commands for real-time utilization monitoring.

15 Claims, 9 Drawing Sheets

(56) References Cited

U.S. PATENT DOCUMENTS

| | | | |
|---|---|---|---|
| 2020/0064403 A1* | 2/2020 | Wendler | G01R 31/31912 |
| 2021/0033497 A1 | 2/2021 | Neeley et al. | |
| 2021/0081257 A1* | 3/2021 | Sauerwein | G06F 9/52 |
| 2021/0173011 A1* | 6/2021 | Kajbaf | G06F 30/27 |
| 2021/0333348 A1* | 10/2021 | Fortney | H03M 1/662 |

OTHER PUBLICATIONS

International Search Report and Written Opinion for PCT/US23/25346 mailed Sep. 18, 2023.

\* cited by examiner

SYSTEMS, DEVICES, AND METHODS FOR ASSET USAGE AND UTILIZATION MEASUREMENT AND MONITORING

CROSS-REFERENCE TO RELATED APPLICATION

This application claims priority to and the benefit of U.S. Provisional Patent Application No. 63/351,876, filed Jun. 14, 2022, the contents of which are hereby incorporated by reference herein for all purposes.

TECHNICAL FIELD

Embodiments relate generally to usage information, and more particularly to remote monitoring of devices.

BACKGROUND

Technology advancements have made leaps and bounds in a wide variety of industries. From wireless communications and data transmission to supercomputing, technology and the equipment that supports it are constantly changing and upgrading. For researchers and businesses to continually stay ahead of the changing landscape, they must use and maintain the latest equipment and test equipment. Unfortunately, constantly purchasing new test equipment is not financially feasible for most companies. Renting test equipment has become an economical option for keeping up with technological changes.

Traditionally, test equipment rental monitoring and associated rental rates have been based on time. Companies needing test equipment would rent the desired equipment and pay based on the rented period. If the rental company used or did not use the equipment during this rental period, this usage was not factored into the rate and could potentially add up to a loss to a rental company. In the event where a piece of equipment is rented but not used, during that same period of time, it is possible that this equipment could have been rented to another customer/user, satisfying more customers/users and getting more use out of the equipment during the same period of time.

Another time-based rental format issue is downtime. Once a piece of equipment is rented, depending on the location, this equipment will need to be shipped, tested, calibrated, and monitored prior to its use. Additionally, shipping and testing must be performed when the equipment is returned, adding to the time when the equipment could be used by other customers/users.

SUMMARY

A method embodiment for detecting and monitoring a device's usage metrics may include: discovering, using a first set of command signals sent from a first computing device, information concerning a set of devices connected to a network; transmitting, a second set of command signals sent from the first computing device, for discovering, for each returned discovered connected device, information about the connected device; transmitting, via a control channel from the first computing device, a third set of command signals which, when responded to, provide a device status information; determining, by the first computing device, device usage metrics comprising usage and utilization measurement associated with the device based on the received signals from the discovered device information, including status information; and determining a utilization management of said monitored device usage metrics.

The method embodiment may further include where the first computing device may be a remote server and a first set of command signals may be transmitted from the remote server to a network router connected to a set of equipment may be monitored. Additionally, the method embodiment may be where the first computing device may be a bench PC and a first set of command signals may be transmitted from the remote server to a network router connected to a set of equipment is to be monitored.

The method may also include where a first set of command signals may be sent from a first computing device within a system where a desired set of equipment to be monitored may be connected. Also, a first set of command signals and a second set of command signals may use a Standard Commands for Programmable Instruments (SCPI) standard communication and the first set of commands, and the second set of commands may be sent at boot-up, prior to an equipment testing initiation.

The method may further include a step where the third set of commands may include signals which poll a status byte. Additionally, the method may include where a first set of command signals may be sent from a first computing system, connected to a set of equipment to be monitored.

A device embodiment may include a bench PC computing device configured to: execute a Status Byte script during boot up and prior to running equipment tests; transmit a query to identify a list of connected test equipment using SCPI commands; receive a list of identified connected test equipment; store the received list of identified connected test equipment; determine specific pieces of information about the previously returned connected test equipment based on the received information; transmit a query using a status byte polling to retrieve a status of each piece of test equipment over a control channel; and determine a usage status of connected test equipment based on the received status byte polling information.

A device embodiment may include a remote server computing device configured to: transmit a query to a network for a list of connected test equipment; receive a list of test equipment connected to the network; store the received list of test equipment; determine specific pieces of information about the previously returned connected test equipment based on the received information; and transmit queries to retrieve a status of each piece of test equipment where returned data may be used to infer a usage status of the equipment.

A method embodiment may include: discovering, using a first set of command signals transmitted from a first computing device, a set of connected devices based on connection information related to a set of monitored devices that may be listed as being connected to a local network, where the first set of command signals may be Standard Commands for Programmable Instruments (SCPI) commands transmitted using a Virtual Instrument Software Architecture (VISA) protocol to retrieve connection information comprising VISA address of the discovered connected devices; transmitting, from the first computing device, a second set of command signals to each discovered connected device, where the second set of command signals may be transmitted to obtain detailed information about the discovered connected device, where the second set of command signals may be transmitted to each VISA address of the discovered connected devices via SCPI commands to obtain the detailed information; determining, based on the obtained detailed information, whether the discovered connected device may be sending and receiving data on a VISA data channel indicating that the discovered connected device may be being used for performing high speed data tests; transmitting, via a control channel from the first computing device, a third set of command signals to elicit a response from each discovered connected device having been determined to be sending and receiving data on a VISA data channel, the response providing device status information, where the third set of command signals may be commands for polling Status Byte (STB) on the control channel and where the STB polling does not block high speed data tests; determining, by the first computing device, a set of device usage status and utilization measurement metrics comprising usage and utilization measurements associated with the discovered connected device based on the received signals, where the received signal comprise status information for each of the discovered connected devices; and determining a real-time utilization monitoring of the discovered connected devices based on the determined set of device usage status and utilization measurement metrics.

In additional method embodiments, the connection information of the discovered connected device further comprises at least one of: a model number, a serial number, an original equipment manufacturer (OEM) name, and OEM identification. Additional method embodiments may include: transmitting, by the first computing device, a request to the network to receive a list of connected devices.

In additional method embodiments, the detailed information further comprises measurement type information, including at least one of: temperature, current, voltage, bandwidth, and frequency. In additional method embodiments, STB polling only collects utilization status information based on whether the discovered connected device may be receiving SCPI commands from a customer test script. In additional method embodiments, STB polling returns values to indicate at least one of: device may be in ready mode, device does not support STB, device may be a low-level device with no Event Register mechanism, data may be ready in the output queue of the device, and an error.

In additional method embodiments, the real-time utilization monitoring of the discovered connected devices allow for at least one of: tracking, managing, repairing, and calibrating the discovered connected device. In additional method embodiments, the first set of command signals and the second set of command signals may be sent during system boot-up, prior to the initiation of equipment testing. In additional method embodiments, the first set of command signals may be dispatched from a first computing system that may be connected to a set of equipment to be monitored.

Additional method embodiments may include: polling, at predetermined intervals, at least one of folders and files that may be altered by execution of a third-party test software, where the third party test software may be capable of interfacing with the discovered connected device directly. In additional method embodiments, polling at predetermined intervals may be performed periodically every ten minutes.

Additional method embodiments may include: inferring, from the date and time stamp of the at least one of folders and files, the utilization of the set of monitored devices. Additional method embodiments may include: transmitting the inferred utilization data to a web service for processing and storage. In additional method embodiments, the second set of command signals may be transmitted to each VISA address of the discovered connected devices via SCPI commands to obtain the detailed information based on a model number prefix of the discovered connected device.

A system embodiment may include: a server computing device in communication with a set of test equipment connected to a local network, where the server computing device may be configured to: execute a Status Byte script during system boot-up and before initiating equipment tests; transmit a query to identify a list of connected test equipment using standard commands for programmable instruments (SCPI) commands; receive a list of identified connected test equipment; store the received list of identified connected test equipment;

determine detailed information about the returned list of identified connected test equipment; transmit a query using status byte polling over a control channel to retrieve a status of each identified connected test equipment, where a returned value of the status byte may be read to determine whether a third party may be sending SCPI commands on the identified connected test equipment and thereby the identified connected test equipment may be in use; determine a usage status of the identified connected test equipment based on the received status byte polling information thereby prevent interference with computing power and communication channels of a test equipment; and if usage status of the identified connected test equipment may be not determined, the server computing device may be configured to: poll, at predetermined intervals, at least one of folders and files that may be altered by execution of a third-party test software; infer, from the date and time stamp of the at least one of folders and files, the utilization of the identified connected test equipment, where returned data may be used to infer usage status of the identified connected test equipment; and transmit the inferred utilization data to a web service for processing, storage, and display in standard utilization dashboards.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
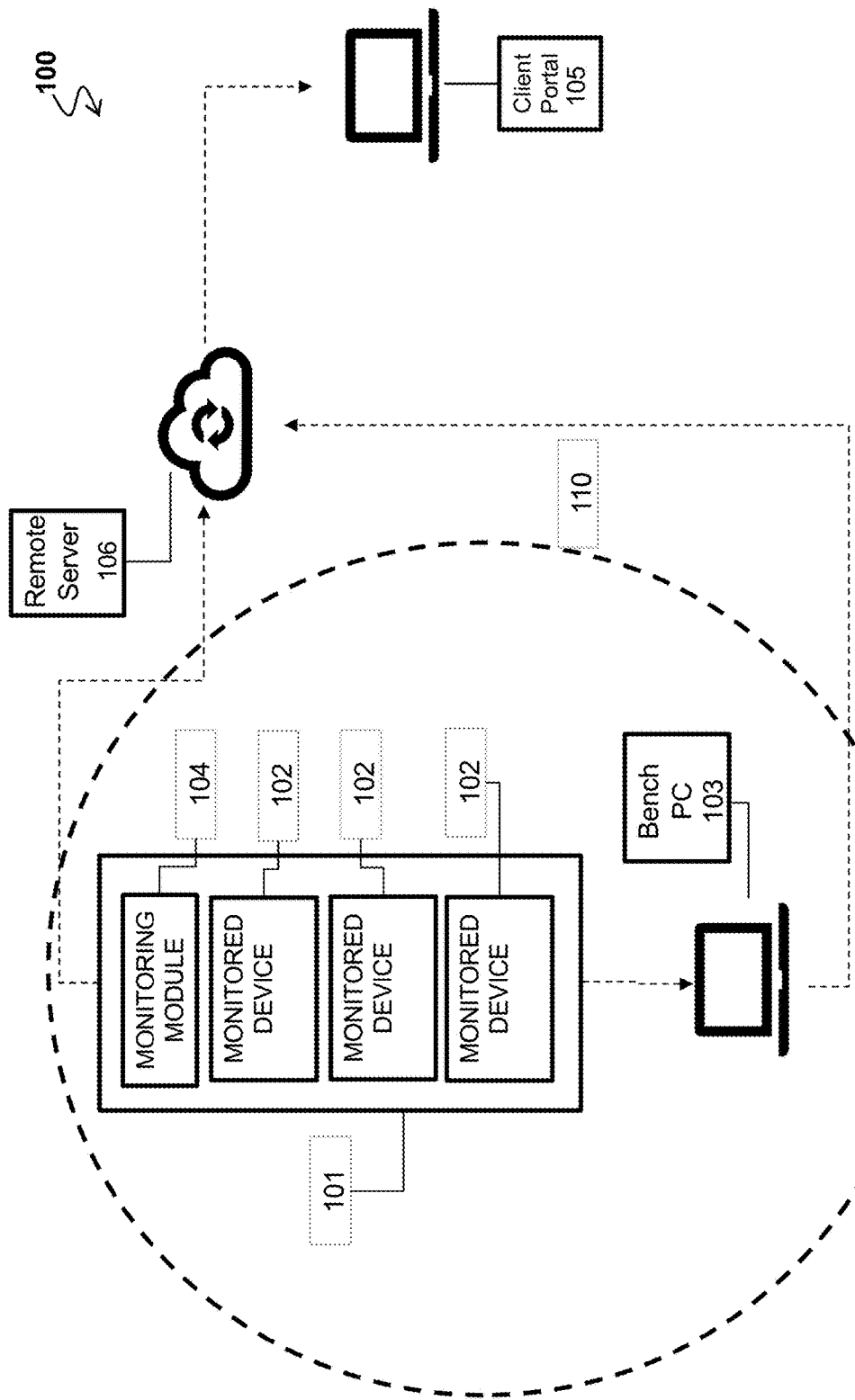
FIG. 1 depicts a functional block diagram for a system for remotely detecting usage of specific pieces of test equipment.

The following detailed description describes the present embodiments with reference to the drawings. In the drawings, reference numbers label elements of the present embodiments. These reference numbers are reproduced below in connection with the discussion of the corresponding drawing features. The described technology concerns one or more methods, systems, apparatuses, and mediums storing processor-executable process steps to execute an asset usage and utilization measurement and monitoring system that collects data to determine such measurements and provide a user with monitoring information. The downtime and unpredictable usage of equipment contributes to a lower return on investment for each piece of equipment and less insight into the condition of equipment upon its return. The fewer hours that a piece of equipment is rented and used, equates to a smaller amount of rental fees over a period of time.

The disclosed systems, methods, and devices for the automated tracking and monitoring of utilization of test instruments, may include: techniques for indirect detection of device usage by polling folders or files produced from test software run; timestamp processing methods for capturing the sequence of device use; machine learning models for the interpretation and prediction of usage patterns; techniques for estimating the device's usage intensity through amplitude analysis; and a computing device capable of integrating utilization and amplitude charts, and generating real-time usage data to produce validation images for performance evaluation, optimization of usage metrics, and visualization of device utilization patterns over time.

Standard methods of communication may be used and are available to send control and query commands to equipment remotely and in real-time. The Standard Command for Programmable Instruments (SCPI) is an ASCII-based instrument command language designed for and used to remotely control measurement and test equipment. SCPI commands are ASCII textual strings, which are sent to the instrument over the LAN physical layer using the Hi SLIP or TCP/IP Socket network protocol. Responses to SCPI query commands are typically ASCII strings, however, for bulk data, binary formats may be used. Queries exist within SCPI, which allow a remote user to determine specific information about a piece of equipment. During instances of high-speed equipment testing, extraneous communication over a single channel can slow down and interfere with testing results and accuracy. Therefore, sending too many queries during these times may interfere with testing and create unsatisfied customers.

The present embodiments disclose methods, systems, and devices for a user, for example, an equipment rental company, to be able to remotely track the usage of rented equipment in real-time without interfering with any tests or operations currently being performed on the equipment. Similarly, end users need to understand the utilization of both rented and owned equipment in order for them to gain insights to help them improve their decision making on renting, buying, sharing, calibration, or disposal of high value test equipment.

The system and method disclosed herein provide for remotely detecting the presence of and measuring the usage of test equipment. One embodiment may include a system comprising at least one monitored device, a remote server, a client portal, and a wired or wireless network. In this embodiment, the remote server may be configured to transmit a query to, for example, the wireless network for a list of connected test equipment. This query returns to the remote server a list of test equipment connected to the wireless network which may then be saved in the remote server. Using this information, the remote server further queries the network to determine specific pieces of information about the previously returned connected test equipment, such as a model number, a serial number, an original equipment manufacturer (OEM) name or identification, a Virtual instrument software architecture (VISA) address, etc. Virtual instrument software architecture (VISA) is an application programming interface (API) that may be used in the test and measurement industry for communicating with instruments from a computer and where a VISA address may provide a unique identifier reference to a device I/O session. Finally, at a set of intervals, which in some embodiments may be evenly timed intervals, using the previously determined VISA addresses, the remote server may transmit a query to obtain a status of each piece of test equipment where returned data is used to infer a usage status of the equipment.

Another aspect of the system embodiments may include a rack or bench which is a framework used to support a multitude of devices within a single compartment. Each device within the rack or bench may be connected via a wired or wireless connection to a remote server, a bench PC, or both. Another aspect of the system embodiments may include a client PC which is connected to the remote server. In this embodiment, data received and populated by the remote server is subsequently transmitted to a client PC where the data may be represented graphically.

The disclosed embodiments of the system may also include a "bench PC". The bench PC may be a laptop or other computing device, designed to locally connect over a wired network to a group of test equipment in a rack or bench to provide local interface and management for the devices within the bench. The bench PC, also being connected to a wireless network, may be queried by a remote server. The bench PC may also be configured to provide information about devices connected to the bench such as equipment connection type as well as a model number, a serial number, an OEM, and a VISA address of each piece of equipment.

In another aspect of the embodiments, the system may include a monitoring component or monitoring module. This monitoring module may be executed and reside within the rack or bench or inside the test equipment and may be connected to a bench PC or wirelessly connected to a remote server. The monitoring module may be configured to record historical and real-time usage data of the test equipment it resides in, or equipment stored in the same bench. When queried, the monitoring device may, in response, transmit the historical and real-time usage data, as well as accompanying equipment detailed identifying information such as a model number, a serial number, an OEM, and a VISA address of each piece of equipment, to a querying device.

In another aspect of the present embodiments, a method is disclosed where software residing on a locally connected bench PC, which is connected to the test equipment of interest, may be loaded prior to tests being run using the locally connected test equipment. The software being executed on the bench PC initially queries the connected test equipment using SCPI commands and saves a returned list of the connected test equipment. The returned list of connected test equipment may then be transmitted to the remote server. Subsequently, the bench PC may further query the connected test equipment for additional detailed information such as serial number, OEM, and VISA address and save the returned information. This information may also be forwarded and saved on a remote server.

In another aspect of the present embodiments, SCPI commands, disclosed as being sent either by a bench PC or a remote server, may be sent via a data channel, where the data channel provides an information route and associated circuitry that is used for the passing of data between systems or parts of systems. In one embodiment, the returned additional detailed information may include data such as a serial number or OEM, where the data may be compared to an internally stored library, within a locally connected bench PC or remote server, and used to determine subsequent equipment specific SCPI commands.

In one embodiment, at evenly timed intervals subsequent to previously transmitted SCPI queries, the bench PC may further query locally connected equipment using Status Byte (STB) polling over a control channel. In this method embodiment, a bench PC running a status byte script may avoid transmitting commands which may conflict with current communications between test equipment and other devices on the network. That is, the STB polling may not block the communication with the instrument allowing the system to send SCPI commands and receive responses in parallel with the STB polling. Accordingly, commands sent by a bench PC may be transmitted over a channel that is not a primary medium of communication by the test equipment. Values returned by status polling are interpreted as usage or non-usage statuses of the connected equipment and sent to a remote server where the data may be compiled to infer test equipment usage. The remote server subsequently transmits the inferred test equipment usage data to a client portal for graphical representation.

In one embodiment, the STB polling may return a value, where the value may indicate a status, for example, 32 meaning device is in ready mode, where this value is changed once a query( ) or read( ) SCPI command is sent to the device; 0 meaning the device does not support STB or a low-level device with no Event Register mechanism; 16 meaning data is ready in the output queue of the device; and 36=32+4 where the 4 indicates an error hence the response of 36 needs to be ignored.

In another embodiment of the present system, the bench PC initially queries the connected test equipment using SCPI commands and saves a returned list of connected equipment. In this embodiment, the bench PC continues to a second step of further querying the connected test equipment for additional detailed information (as stated above) and saves the returned information. Using the returned information, the bench PC continues to a subsequent step of querying the locally connected equipment at evenly timed intervals using a control channel and saving the returned data locally. Additionally, at the request of a remote server, at an arbitrary time, the bench PC may transmit locally collected equipment usage data to a remote server where it is saved and compiled.

In one embodiment, the system may be configured to collect data at a time interval that is different than the time interval in which the data is transmitted to a remote server. That is, in one scenario, the data is collected in shorter intervals and more often than the data is being transmitted, and in another scenario, data may be collected in longer intervals than being transmitted to a remote server, where each scenario may provide advantages that will become more evident with this disclosure. Other aspects of the present embodiments include a method in which any combination of querying a network, receiving collected information from a bench PC, and/or interrogating specific pieces of equipment residing on a bench or rack of interest, are used to collect and populate a connected equipment list and/or equipment usage data on a remote server. In another embodiment, based on transmitting SCPI commands to the test equipment, if the remote server or bench PC receives values returned by status polling indicating that the test equipment is in use, the system may change the scheduled queries and/or interrogation for equipment usage data. That is, the system may perform the collection of data at an interval commensurate with the usage, for example, pause or use longer time intervals if the test equipment is in use and/or shorten the time interval and query the test equipment more often if the test equipment is not in use.

FIG. 1 depicts a functional block diagram of the present embodiments representing an asset usage and utilization measurement and monitoring system 100. In one embodiment, a remote server 106 may be configured to receive and process device utilization data related to one or more monitored device(s) 102 and a monitoring module 104 wirelessly. In one embodiment, device utilization information may be sent to the remote server 106 in a variety of different ways including directly through a wireless network 110, through a bench PC 103, or through a monitoring device 102. In one embodiment, device utilization information may be received by the remote server 106 in response to sending a first set of commands which query a network 110, where the desired monitored devices 102 are connected. In another embodiment, the remote server 106 may also receive monitored device 102 information from a bench PC 103, which monitors and stores monitored device 102 information. The bench PC 103 may transmit the stored monitored device 102 information in real-time or at predefined regular or irregular intervals, as disclosed herein.

In another embodiment, the remote server 106 may receive utilization information from an internal system or monitoring module 104, which directly monitors utilization information of test bench 101 monitored devices 102. Once the remote server 106 is populated with the information concerning which monitored devices 102 are connected to a network 110, the remote server 106, may transmit a second set of commands to the appropriate device/system (103, 110, or 104), to retrieve additional information concerning the connected devices. Information such as model number, OEM, serial number, options, and VISA address, are among some of the information which may be retrieved by the second set of commands. Once specific equipment information about the connected monitored devices 102 is received, the remote server 106 transmits a third set of commands on a control channel. The control channel in some embodiments is a channel which is not used as a primary means of communication between monitored devices 102 or any other connected devices and therefore may be used to retrieve basic information about connected monitored devices 102.

Retrieval of information by the remote server 106 using a control channel is typically referred to, in the industry, as Status Byte (STB) polling. STB information returned by monitored devices 102 and/or internal device or monitoring module 104 may be interpreted as values ranging between 0 and 32. Upon receipt of the STB values, the remote server 106 may be configured to interpret these values as equipment status and ultimately equipment usage data. This equipment usage data is compiled and served as preformatted graphical representations to a client device 105.

Figure 2:
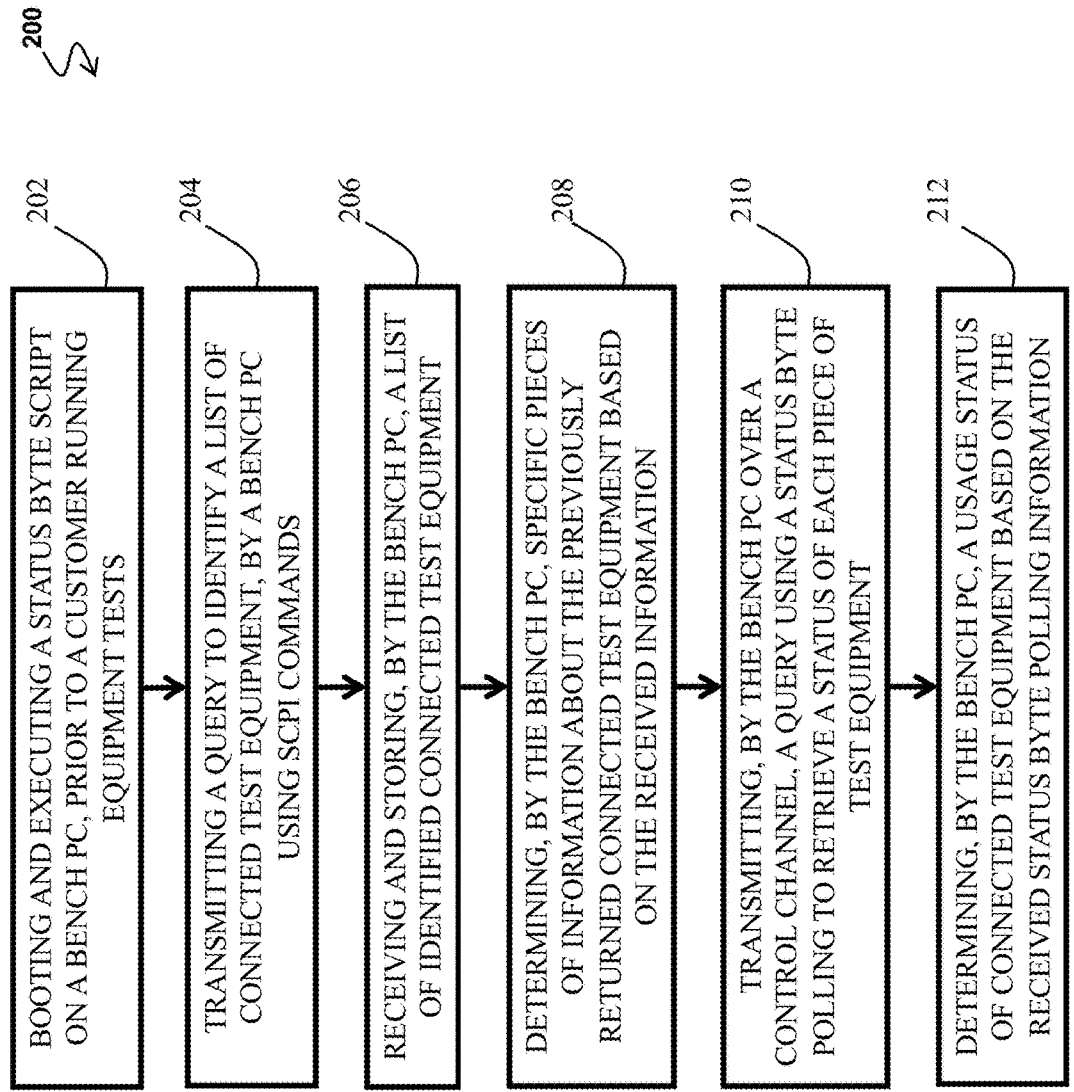
FIG. 2 depicts a process flow chart of an asset usage and utilization measurement and monitoring system.

FIG. 2 depicts a process flow chart of an asset usage and utilization measurement and monitoring system 200 based on information retrieval from a bench PC. The process steps may include: initially booting and executing on a bench PC, a status byte script prior to executing a set of tests on an equipment (step 202); transmitting by the bench PC using SCPI commands to connected equipment, a query to identify a list of connected test equipment (step 204); receiving and storing, by the bench PC, a list of identified connected test equipment (step 206); determining, by the bench PC, specific pieces of information about the previously returned connected test equipment based on the received information (step 208); transmitting, by the bench PC over a control channel, a query using a status byte polling to retrieve a status of each piece of test equipment (step 210); and determining, by the bench PC, a usage status of connected test equipment based on the received status byte polling information (step 212). According to the disclosed method embodiment, the system may be configured to provide utilization by the bench and thereby determine an implied usage that cannot be achieved by the server polling method alone or other means.

Furthermore, embodiments of the system may address additional scenarios concerning the monitoring of device utilization. Some test instruments may not support the direct reporting of utilization via the status byte. In such cases, the system may instead infer utilization indirectly by polling particular folders or files. These folders or files are typically altered when a user runs their own or third-party test software capable of interfacing with the instrument directly. The date and time stamp of these folders or files may be used to indicate the last time a test was run using the instrument. A utilization monitor running on a computing device, such as a bench PC or a client device, may be programmed to poll these folders or files at regular intervals, for instance, every 10 minutes. This arrangement allows the system to capture a sequence of date and time stamps as a test changes these files.

In one embodiment, the collected sequence of date and time stamps may then be transmitted to a web service, for example, an asset optimization software web service, for further processing. This data may be stored and displayed on standard utilization dashboards that present a visual timeline of the device's usage metrics. This mechanism provides a practical and efficient way to monitor the utilization of test instruments that do not directly support the reporting of utilization.

Figure 3:
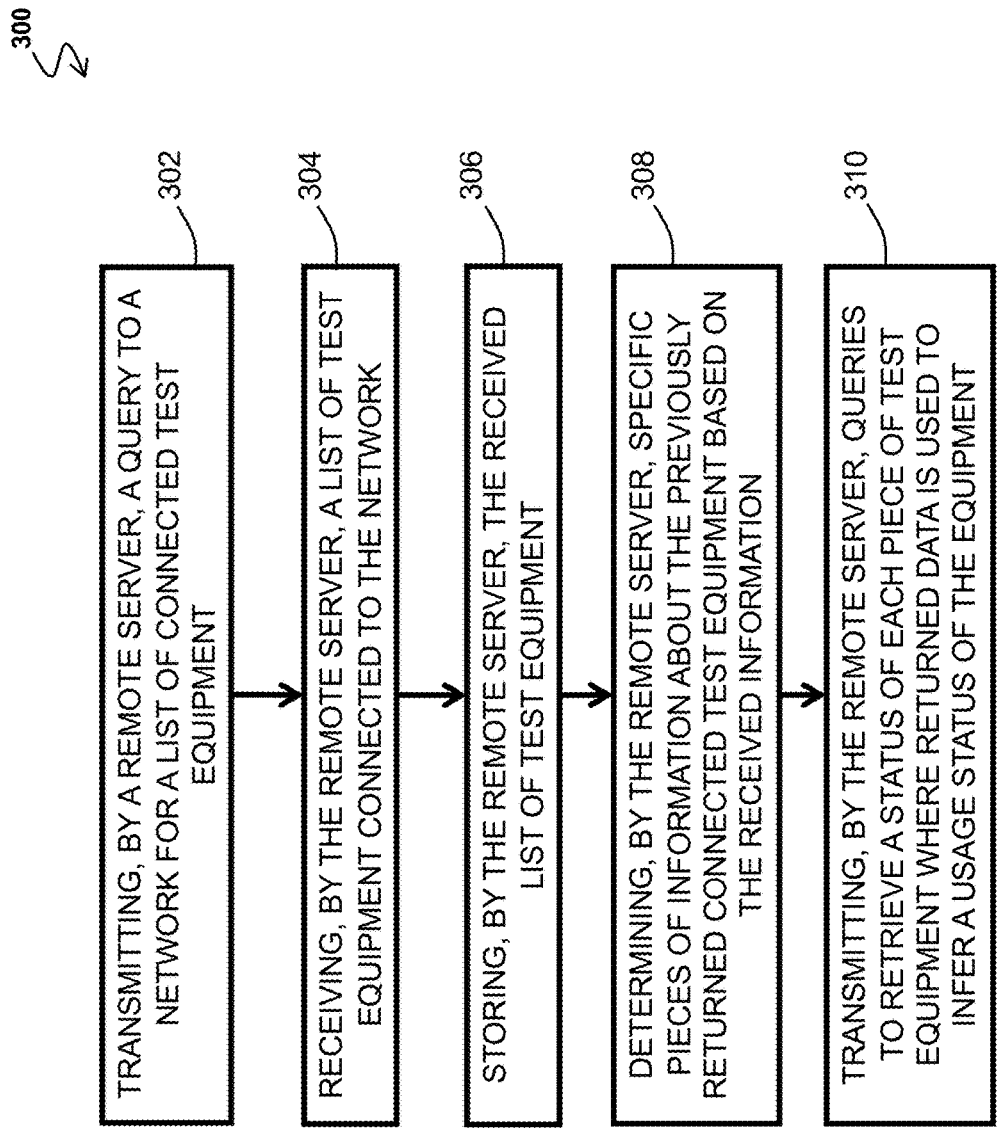
FIG. 3 depicts a process flow chart of an asset usage and utilization measurement and monitoring system.

FIG. 3 depicts a process flow chart of an asset usage and utilization measurement and monitoring system 300 based on information retrieval from a remote server. The process steps may include: transmitting, by a remote server, a query to a network for a list of connected test equipment (step 302); receiving, by the remote server, a list of test equipment connected to the network (step 304); storing, by the remote server, the received list of test equipment (step 306); determining, by the remote server, specific pieces of information about the previously returned connected test equipment based on the received information (step 308); and transmitting, by the remote server, queries to retrieve a status of each piece of test equipment where returned data is used to infer a usage status of the equipment (step 310).

In one embodiment, SCPI commands may be configured to be used to get utilization status information, where the remote server device may be configured to determine if SCPI commands may block the VISA data channel for high speed tests (see above) and execute an alternative method of polling the status byte on the control channel, where the STB polling does not block high speed tests. In this embodiment, the STB polling may collect utilization based on whether the instrument is receiving SCPI commands and not measurement type information.

In one embodiment, the equipment usage data may be based on utilization information collected from the devices on the network where the remote server computing device may be configured to perform a utilization analysis to identify unused assets or rental opportunities. The embodiments implementing the utilization analysis may provide a real-time utilization chart where a Boolean representation of the equipment usage, e.g., 1/0, may be displayed. Additional data, such as amplitude measurements of the equipment usage may also be displayed.

In another embodiment, the system may be configured to execute one of two scripts where the system includes a determination to check at the beginning of a master script to identify the kinds of test equipment connected to the network. Based on this determination, the system may then either be configured to execute a STB script or a non-STB script. That is, if the system detects that high speed equipment are connected to the network, then the system may assume the user may be performing high speed tests and likely to consume most of the data channel, thereby the system may be configured to execute the STB script by default. Alternatively, if the connected equipment are not performing high speed tests, then the system may execute the non-STB script by default.

According to the disclosed embodiments, the system may utilize two methods executed by the computing device, where one method uses only SCPI commands to get identity, utilization and device measurements which incorporates a library of SCPI command combinations covering a number of approximately (60) families of test equipment (equating to 1000s of actual testing equipment products). Thereby, the system may be configured to create a library based on sending a command, for example: self.session.write ('*IDN?'), for each connected instrument, which returns Model No, OEM, Serial No, Options and VISA address. Thereafter, for each VISA address and depending on a model prefix, the system may execute commands to retrieve a set of measurement type information (e.g., temperature, current, voltage, bandwidth, or frequency) via the library of common groups of SCPI commands based on the model number and prefix. Additionally, the STB method of execution may use SCPI commands to get the identity of assets at boot up before beginning the user tests and then execute the STB method to determine utilization data. The non-STB method may then be executed by a system with low speed tests where clashing is not likely on the data channel, but has the advantage of being able to get measurements as well.

Figure 4:
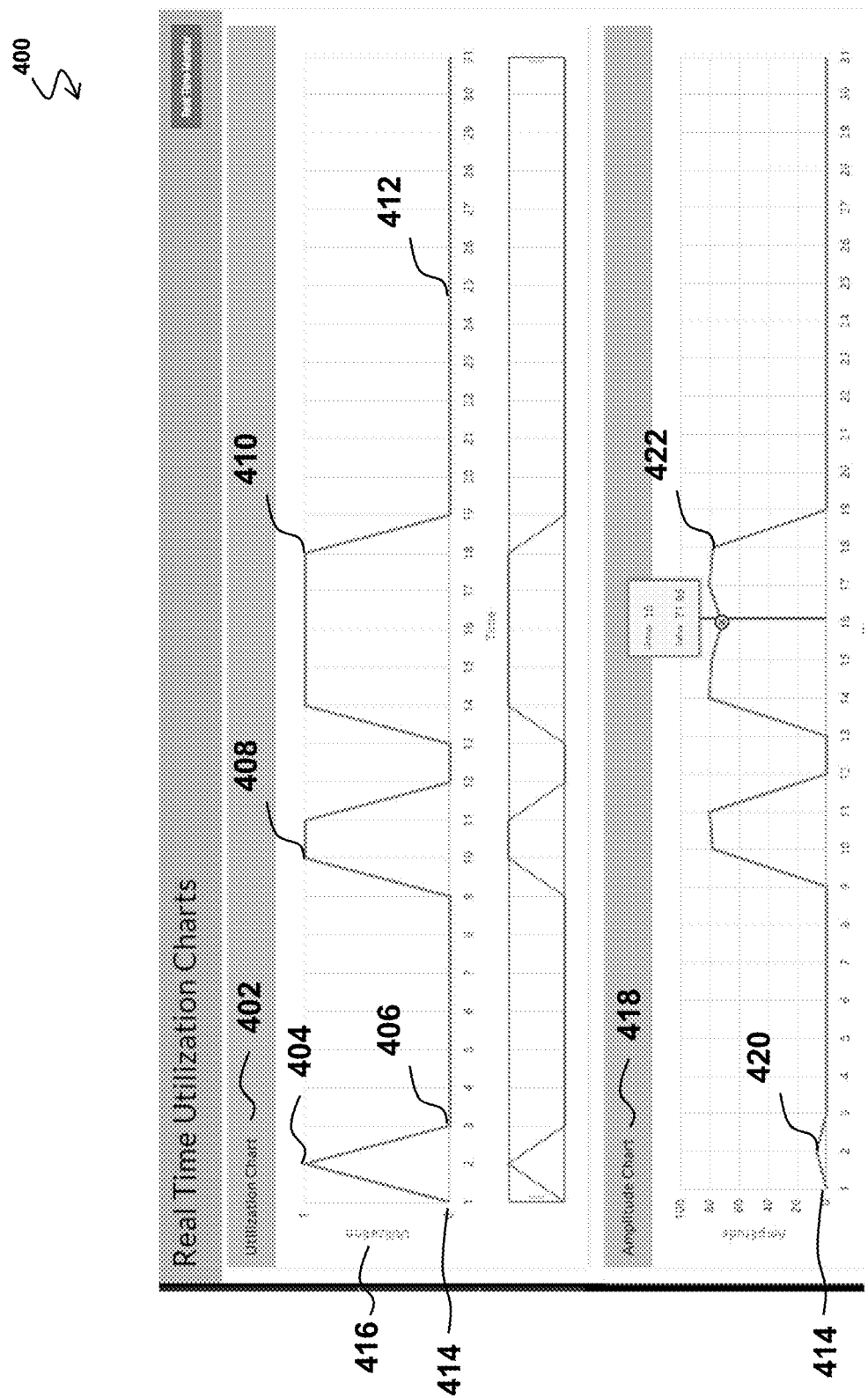
FIG. 4 depicts a user interface illustrating a Real-Time Utilization Chart.

FIG. 4 depicts an illustrative real-time utilization user interface 400 displaying real-time device utilization metrics. The user interface presents two distinct line charts that provide insights into the usage patterns of a monitored device. The first line chart, referred to as the "Utilization Chart" 402, maps the monitored device's utilization over time, where an X-axis 414 represents time, measured in units incrementally increasing by one, and the Y-axis indicates utilization 416, ranging from 0 to 1. The line on this chart visually represents the fluctuation in the monitored device's usage. For instance, at point (2,1) 404, a value of 1 at time 2 indicates a usage of a monitored device. This utilization drops to zero at point (3,0) 406 and continues without usage until point (10,1) 408 where the monitored device is indicated to have been in use until point (11,1). From point (14,1) to (18,1) 410, the device experiences full usage (1) again, dropping back to zero at point (19,0) (not labeled). During the time span represented by points (19,0) to (31,0) 412, the device exhibits no utilization.

The second line chart, titled "Amplitude Chart" 418, similarly displays time on the x-axis 414, with an additional variable, amplitude, on the y-axis 418. This chart begins with an amplitude of zero at time 1 (not labeled), increasing to an amplitude of at point (2, 10) 420, before dropping back to zero at point (3,0) corresponding to point (3,0) 406 on the utilization chart 402. This pattern of variation in amplitude continues, with significant spikes observed between points represented by reference number 422 corresponding to range represented by reference number 410, where amplitude varies from 80 to 60. The amplitude drops back to zero at time 19 (not labeled) and remains at zero through time 31 corresponding to the same range represented by reference number 412 in the Utilization Chart 402.

The embodiment of a user interface, as illustrated in the "Real-Time Utilization Charts" 400, delivers an in-depth representation of the functioning of a singular device, captured over an incremental time period. The "Utilization Chart" 402 and the "Amplitude Chart" 418, individually and in conjunction, provide a detailed analysis of the monitored device's usage dynamics and intensity of operation. Both these charts correlate with each other temporally, denoting the same timeframe on their respective x-axis 414. This implies that for any given point in time, the level of device usage depicted on the Utilization Chart 402 directly corresponds to the operational amplitude demonstrated on the Amplitude Chart 418. For instance, a spike in utilization may parallel an increase in amplitude, and vice versa. Consequently, this correlation not only provides a comprehensive understanding of when the monitored device is being used but also indicates the intensity or extent of the monitored device's utilization at those specific intervals. Therefore, the disclosed charts provide insights into the overall operational behavior of the monitored device, enabling effective monitoring and optimization of the monitored device's usage metrics.

In another embodiment, additional parameters may be integrated into the real-time utilization charts 400 to indicate monetized dollar amounts associated with signal usage times. This chart may present a cost efficiency analysis, mapping usage time of a monitored device against associated operational costs. The cost may account for factors such as energy consumption, maintenance, depreciation, and opportunity cost of the device usage. This added layer of information may provide a clear understanding of the financial implications of the device usage, enabling managers and stakeholders to make more informed and cost-effective decisions concerning the allocation and utilization of these devices.

In another embodiment, the real-time utilization charts 400 may incorporate threshold indicators to flag critical usage levels. These indicators may be set to trigger alerts when usage surpasses a predefined limit, potentially indicating a risk of equipment overload, malfunction, or premature failure. By tracking these threshold levels in real-time, the system provides early warning signs of potential issues, allowing preemptive measures to be taken to prevent equipment damage and avoid downtime.

In one embodiment, the system may incorporate additional charts or modify existing charts to display equipment-specific metrics, such as temperature, pressure, or other relevant operational parameters. These metrics may be used to monitor the overall health and operational status of the equipment in real time. For instance, a rising temperature trend may indicate an issue with the cooling system or a potential overload, allowing technicians to intervene before the equipment overheats. The inclusion of such metrics may not only provide insights into the usage patterns but also the health and longevity of the equipment, thereby facilitating effective maintenance planning and ensuring the smooth operation of the devices.

FIGS. 5-8 and the following discussion provide a brief, general description of a suitable computing environment in which aspects of the described technology may be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

Figure 5:
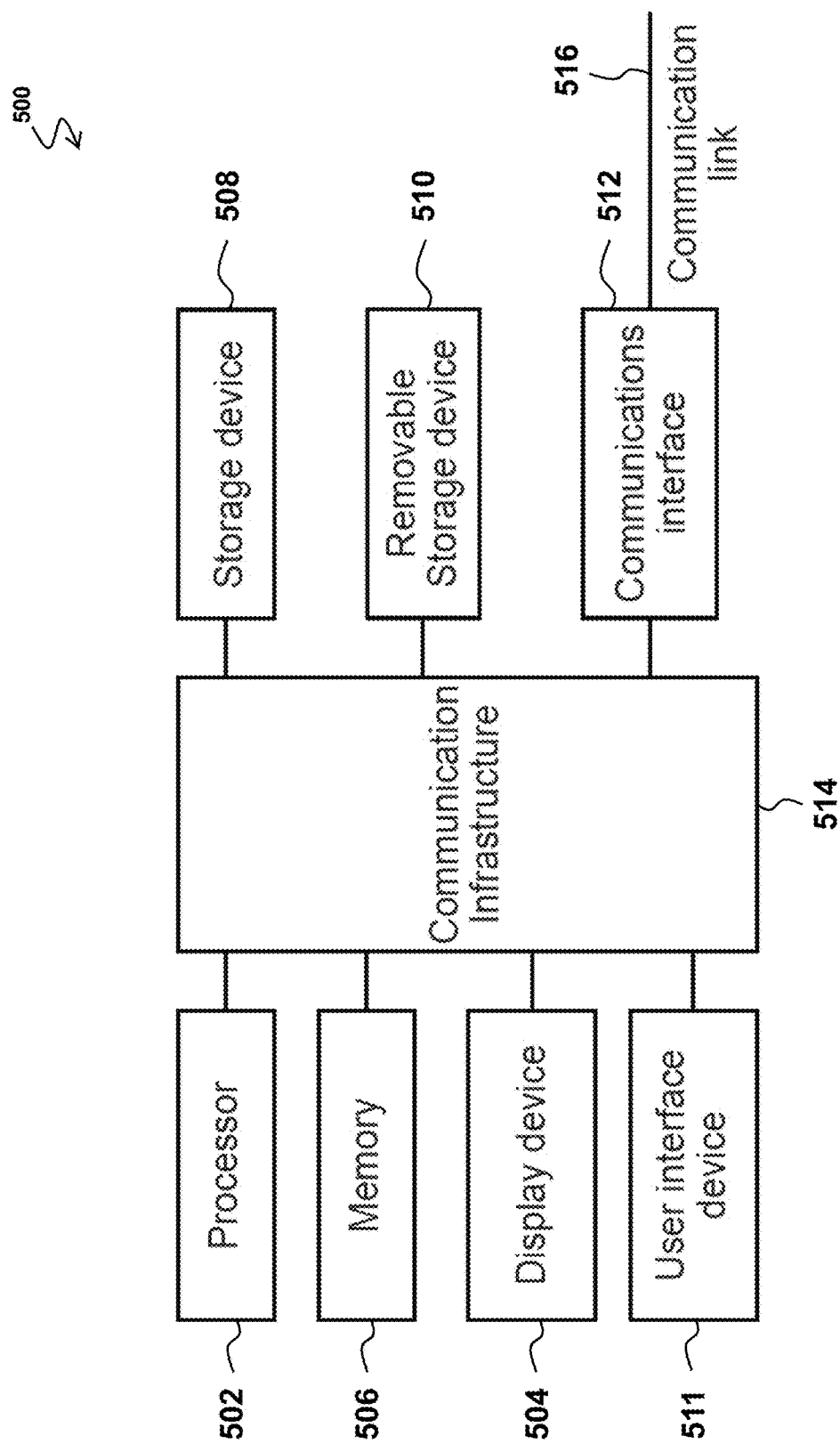
FIG. 5 is a high-level block diagram showing a computing system comprising a computer system useful for implementing an embodiment of the system and process.

FIG. 5 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 6:
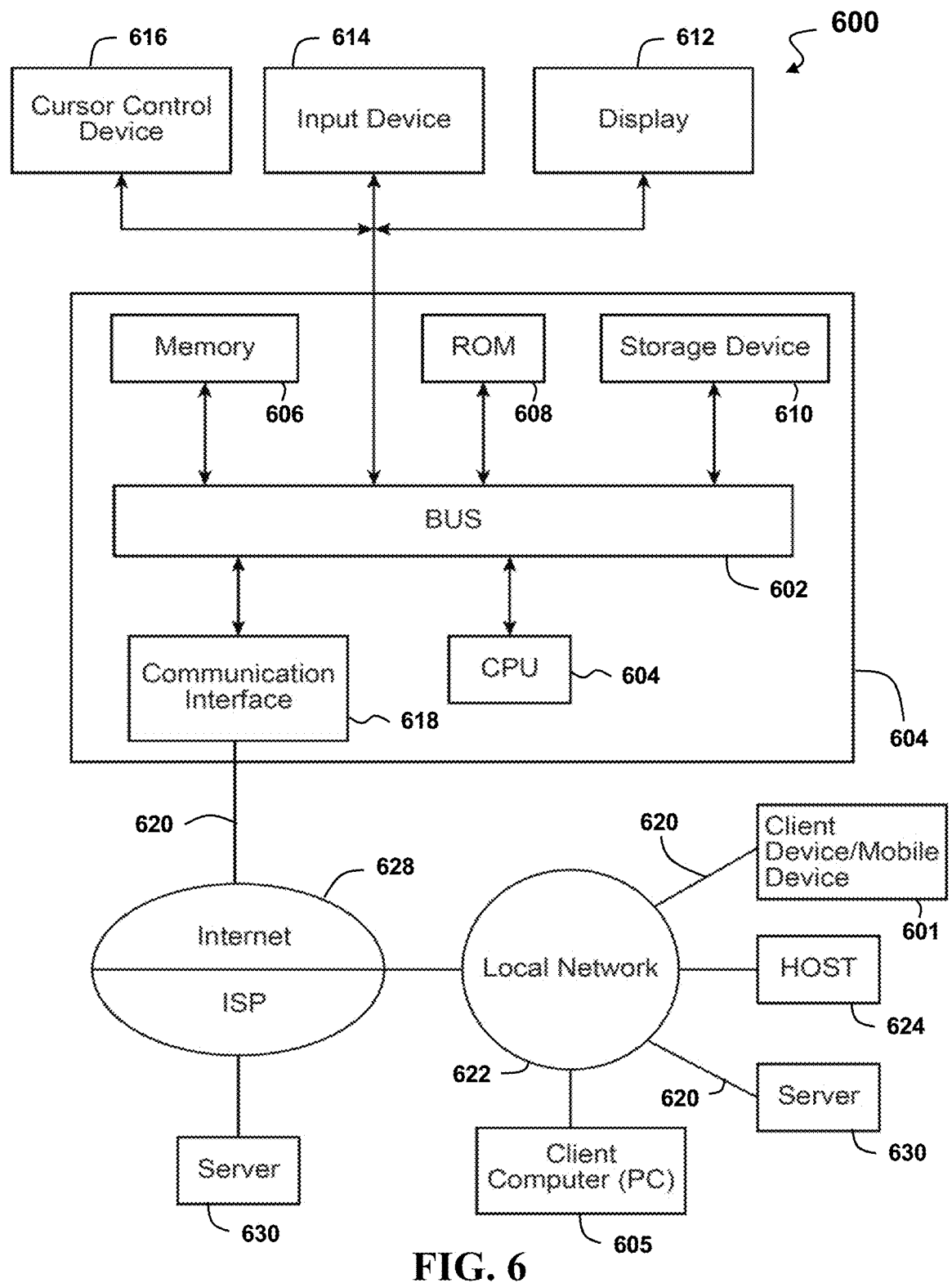
FIG. 6 shows a block diagram of an example system in which an embodiment may be implemented.

FIG. 6 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic, or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider, or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630. The system 600 can further include computers (e.g., personal computers, computing nodes) 605 operating in the same manner as client devices 601, where a user can utilize one or more computers 605 to manage data in the server 630.

Figure 7:
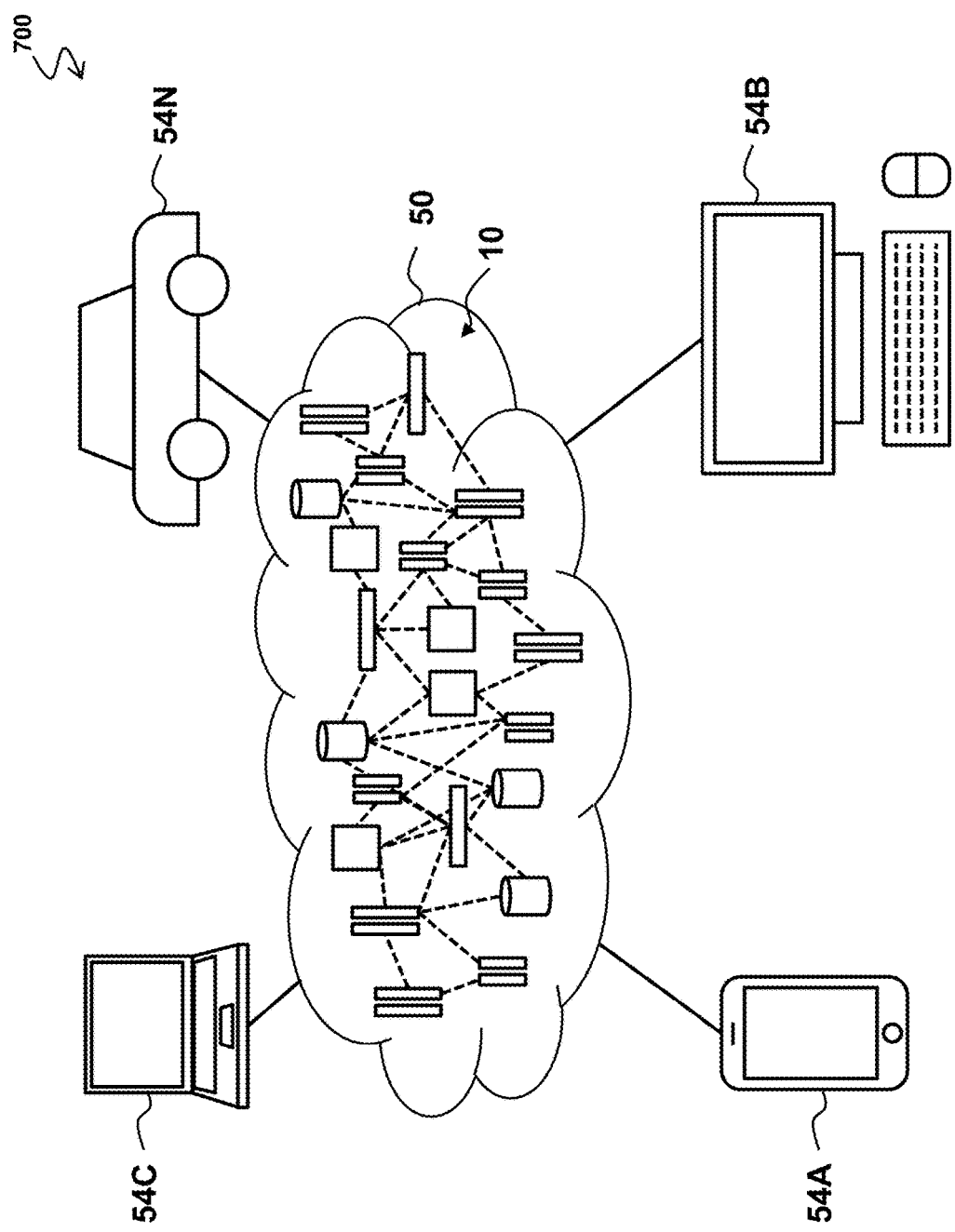
FIG. 7 depicts an illustrative cloud computing environment, according to one embodiment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
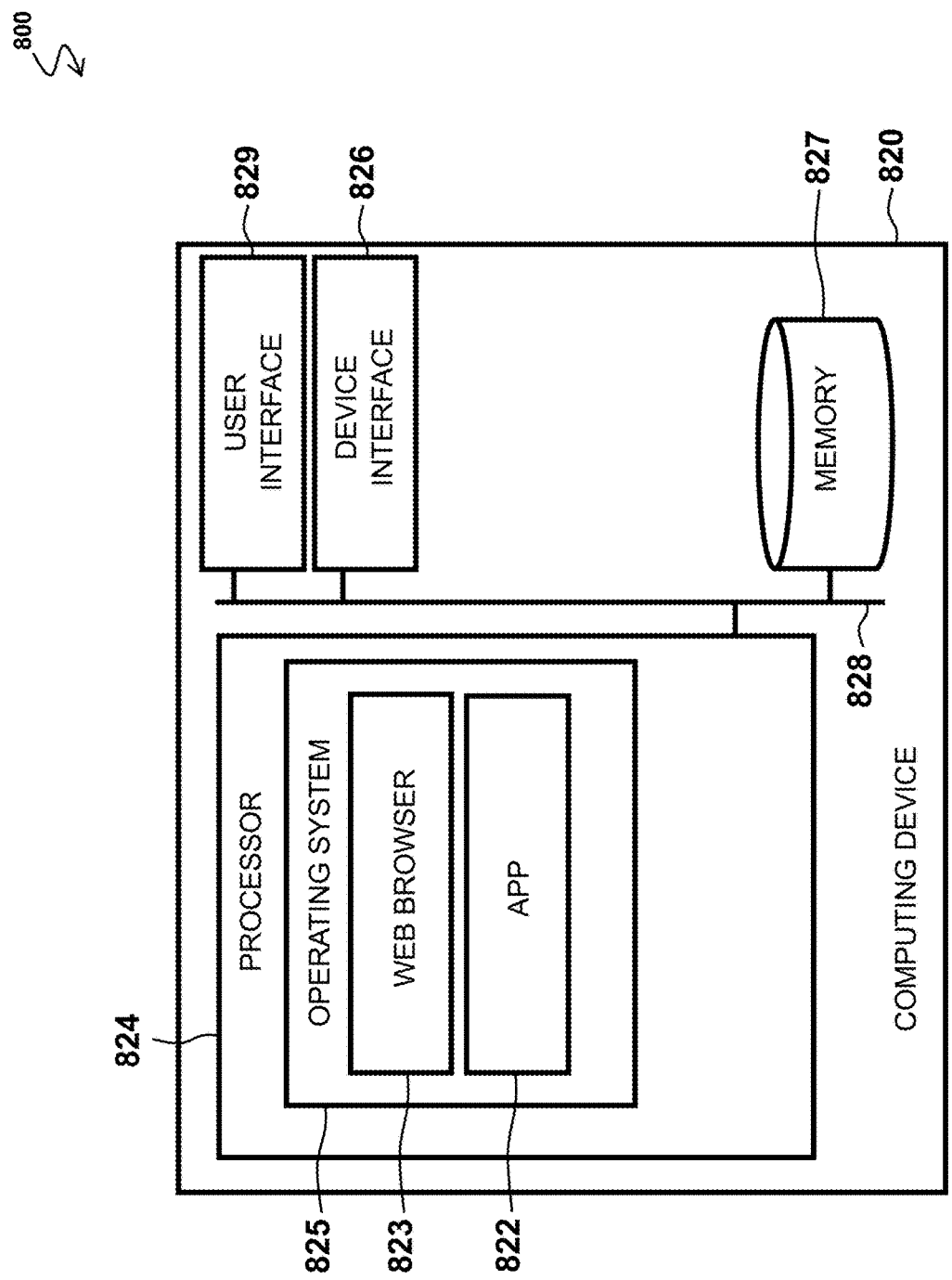
FIG. 8 illustrates an example of a top-level functional block diagram of a computing device embodiment.

FIG. 8 illustrates an example of a top-level functional block diagram of a computing device embodiment 800. The example operating environment is shown as a computing device 820 comprising a processor 824, such as a central processing unit (CPU), addressable memory 827, an external device interface 826, e.g., an optional universal serial bus port and related processing, and/or an Ethernet port and related processing, and an optional user interface 829, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 820, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 828. In some embodiments, via an operating system 825 such as one supporting a web browser 823 and applications 822, the processor 824 may be configured to execute steps of a process establishing a communication channel and processing according to the embodiments described above.

Figure 9:
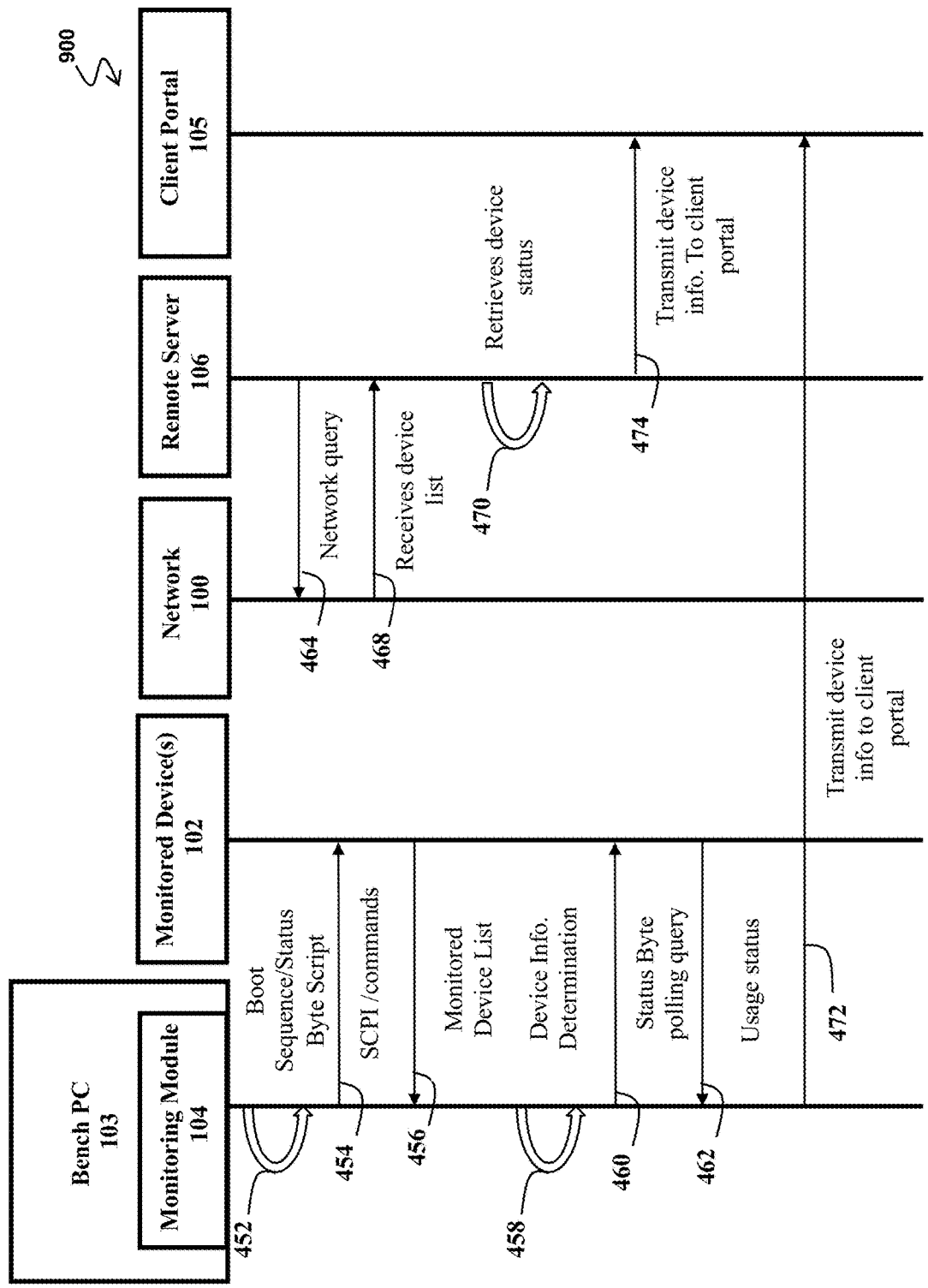
FIG. 9 depicts a signal flow diagram of an asset usage and utilization measurement and monitoring system.

FIG. 9 presents a signal flow diagram 900 illustrating the interaction between components of an asset usage and utilization measurement and monitoring system (see also FIG. 1). The components may include a bench PC 103, client portal 105, remote server 106, monitoring component module 104, and monitored device(s) 102. The process begins with the monitoring component module 104 residing on the bench PC 103, initiating a boot sequence and executing a status byte script 452. This script, as described in step 202 of FIG. 2, may be launched prior to the execution of any tests on the monitored device(s) 102. Upon successful boot and execution of the status byte script, the monitoring module 104 may transmit SCPI commands 454 to the connected monitored device(s) 102. As illustrated in step 204 of FIG. 2, these commands serve to identify the list of connected equipment. The monitoring component module 104 may then receive 456 and store the list of identified monitored device(s) 102. Subsequently, the monitoring component module 104 may determine specific information about each device 458 based on the received data, as stated in step 208 of FIG. 2.

The monitoring component module 104 may then transmit a status byte polling query 460 over a control channel to each detected monitored device(s) 102. Using the information retrieved, the monitoring component module 104 may determine the usage status 462 of each detected monitored device(s) 102, as described in step 212 of FIG. 2. At the same time, the remote server 106 may be performing a similar process. As per the steps in FIG. 3, the remote server may query the network 464 for a list of connected monitored device(s) 102, and then receive the device list 468 and store this list. The remote server may then determine specific information about each device and retrieve the status of each device using queries 470.

Both the monitoring component module 104 on the bench PC 103 and remote server 106 may then transmit their findings to the client portal 105 (472 and 474, respectively). The client portal 105, potentially via the user interface depicted in FIG. 4, may display the data received from both the monitoring component module 104 and remote server 106. This integration provides a comprehensive view of asset utilization, enabling effective monitoring and optimization of usage metrics.

The disclosed test equipment real-time utilization monitoring embodiments may use a PC on a bench connected to the equipment using scripts or a number of web services via network cables or GPIB/USB cables to gather utilization information and perform an analysis to identify unused assets or rental opportunities. That is, the disclosed embodiments provide methods, systems, and devices for emulation of usage of equipment using a workflow module to track, manage, repair, and/or calibrate the asset. This is further done by connecting the assets to a server via network cables or a bench PC via GPIB/USB cables. In one embodiment, a programming language such as Python with embedded NI VISA library may be executed to call SCPI commands. In this embodiment, the SCPI commands, originally designed to be used to control assets/instruments, may be used instead to obtain utilization status of the assets.

As described herein, SCPI commands may be sent to the instrument through any VISA controller, where VISA is a commonly used API in the Test and Measurement industry for communicating with instruments from a PC. The physical connection between the PC and the instrument may be via a USB or Ethernet port. NI-VISA is the National Instruments implementation of the VISA I/O standard. Therefore, the VISA protocol may be used to connect to an asset/equipment and SCPI commands used to obtain utilization status of the asset/equipment.

In one embodiment, executing SCPI commands on the VISA data channel may block the VISA data channel for high speed tests being performed by users and therefore an alternative method is disclosed where the system may be configured to perform polling of the status byte on the control channel. This is known as Status Byte (STB) polling and does not block high speed tests being performed on the asset/equipment. That is, they STB polling may only collect utilization information/data based on whether the instrument is receiving SCPI commands from a user test script and may not retrieve measurement type information.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:
    discovering, using a first set of command signals transmitted from a first computing device, a set of connected devices based on connection information related to a set of monitored devices that are listed as being connected to a local network, wherein the first set of command signals are Standard Commands for Programmable Instruments (SCPI) commands transmitted using a Virtual Instrument Software Architecture (VISA) protocol to retrieve connection information comprising VISA address of the discovered connected devices;
    transmitting, from the first computing device, a second set of command signals to each discovered connected device, wherein the second set of command signals are transmitted to obtain detailed information about the discovered connected device, wherein the second set of command signals are transmitted to each VISA address of the discovered connected devices via SCPI commands to obtain the detailed information;
    determining, based on the obtained detailed information, whether the discovered connected device is sending and receiving data on a VISA data channel indicating that the discovered connected device is being used for performing high speed data tests;
    transmitting, via a control channel from the first computing device, a third set of command signals to elicit a response from each discovered connected device having been determined to be sending and receiving data on a VISA data channel, the response providing device status information, wherein the third set of command signals are commands for polling Status Byte (STB) on the control channel and wherein the STB polling does not block high speed data tests;
    determining, by the first computing device, a set of device usage status and utilization measurement metrics comprising usage and utilization measurements associated with the discovered connected device based on the received signals, wherein the received signal comprise status information for each of the discovered connected devices; and determining a real-time utilization monitoring of the discovered connected devices based on the determined set of device usage status and utilization measurement metrics.

2. The method of claim 1, wherein the connection information of the discovered connected device further comprises at least one of: a model number, a serial number, an original equipment manufacturer (OEM) name, and OEM identification.

3. The method of claim 1, further comprising:
transmitting, by the first computing device, a request to the network to receive a list of connected devices.

4. The method of claim 1, wherein the detailed information further comprises measurement type information, including at least one of: temperature, current, voltage, bandwidth, and frequency.

5. The method of claim 1, wherein STB polling only collects utilization status information based on whether the discovered connected device is receiving SCPI commands from a customer test script.

6. The method of claim 5, wherein STB polling returns values to indicate at least one of: device is in ready mode, device does not support STB, device is a low-level device with no Event Register mechanism, data is ready in the output queue of the device, and an error.

7. The method of claim 1, wherein the real-time utilization monitoring of the discovered connected devices allow for at least one of: tracking, managing, repairing, and calibrating the discovered connected device.

8. The method of claim 1, wherein the first set of command signals and the second set of command signals are sent during system boot-up, prior to the initiation of equipment testing.

9. The method of claim 1, wherein the first set of command signals are dispatched from a first computing system that is connected to a set of equipment to be monitored.

10. The method of claim 1, further comprising:
polling, at predetermined intervals, at least one of folders and files that are altered by execution of a third-party test software, wherein the third party test software is capable of interfacing with the discovered connected device directly.

11. The method of claim 10, wherein polling at predetermined intervals is performed periodically every ten minutes.

12. The method of claim 10, further comprising:
inferring, from the date and time stamp of the at least one of folders and files, the utilization of the set of monitored devices.

13. The method of claim 11, further comprising:
transmitting the inferred utilization data to a web service for processing and storage.

14. The method of claim 2, wherein the second set of command signals are transmitted to each VISA address of the discovered connected devices via SCPI commands to obtain the detailed information based on a model number prefix of the discovered connected device.

15. A system comprising:
a server computing device in communication with a set of test equipment connected to a local network, wherein the server computing device is configured to:
execute a Status Byte script during system boot-up and before initiating equipment tests;
transmit a query to identify a list of connected test equipment using standard commands for programmable instruments (SCPI) commands;
receive a list of identified connected test equipment;
store the received list of identified connected test equipment;
determine detailed information about the returned list of identified connected test equipment;
transmit a query using status byte polling over a control channel to retrieve a status of each identified connected test equipment, wherein a returned value of the status byte is read to determine whether a third party is sending SCPI commands on the identified connected test equipment and thereby the identified connected test equipment is in use;
determine a usage status of the identified connected test equipment based on the received status byte polling information thereby prevent interference with computing power and communication channels of a test equipment; and
if usage status of the identified connected test equipment is not determined, the server computing device is configured to:
poll, at predetermined intervals, at least one of folders and files that are altered by execution of a third-party test software;
infer, from the date and time stamp of the at least one of folders and files, the utilization of the identified connected test equipment, wherein returned data is used to infer usage status of the identified connected test equipment; and
transmit the inferred utilization data to a web service for processing, storage, and display in standard utilization dashboards.

* * * * *